United States Patent
Hildom et al.

(10) Patent No.: US 10,625,867 B2
(45) Date of Patent: Apr. 21, 2020

(54) INTEGRABLE SEAT LEG

(71) Applicant: Fenton Mobility Products, Inc., Jamestown, NY (US)

(72) Inventors: Gerald James Hildom, Jamestown, NY (US); Scott Ivan Fenton, Sinclairville, NY (US)

(73) Assignee: Fenton Mobility Products, Inc., Jamestown, NY (US)

( * ) Notice: Subject to any disclaimer, the term of this patent is extended or adjusted under 35 U.S.C. 154(b) by 28 days.

(21) Appl. No.: 16/150,808

(22) Filed: Oct. 3, 2018

(65) Prior Publication Data

US 2019/0106217 A1    Apr. 11, 2019

Related U.S. Application Data

(60) Provisional application No. 62/568,577, filed on Oct. 5, 2017.

(51) Int. Cl.
| | |
|---|---|
| *B64D 25/04* | (2006.01) |
| *B64D 11/06* | (2006.01) |
| *B60N 2/015* | (2006.01) |
| *B64C 1/18* | (2006.01) |
| *B60N 2/68* | (2006.01) |

(52) U.S. Cl.
CPC .......... *B64D 11/0696* (2013.01); *B60N 2/015* (2013.01); *B60N 2/01575* (2013.01); *B60N 2/01583* (2013.01); *B60N 2/68* (2013.01); *B64C 1/18* (2013.01)

(58) Field of Classification Search
CPC ........................... B64D 11/0696; B64D 11/06
See application file for complete search history.

(56) References Cited

U.S. PATENT DOCUMENTS

| | | | | |
|---|---|---|---|---|
| 4,229,040 A | * | 10/1980 | Howell | B64D 11/0648 297/440.1 |
| 4,375,300 A | * | 3/1983 | Long | B60N 2/242 244/122 R |
| 4,771,969 A | | 9/1988 | Dowd | |
| 4,796,837 A | * | 1/1989 | Dowd | B64D 11/0696 244/122 R |
| 4,856,738 A | * | 8/1989 | Martin | B64D 11/0696 244/122 R |
| 4,878,640 A | * | 11/1989 | Fricker | E04B 1/4107 248/297.21 |
| 4,911,381 A | * | 3/1990 | Cannon | B64D 11/0696 244/122 R |

(Continued)

FOREIGN PATENT DOCUMENTS

CA          2315950          2/2001

*Primary Examiner* — Shin H Kim
(74) *Attorney, Agent, or Firm* — Simpson & Simpson, PLLC

(57) ABSTRACT

An integrable seat leg for an original equipment manufacturer seat, including a vertical member, including a front end and a rear end, a first side surface and a second side surface, a top surface and a bottom surface, one or more engaging members extending from the bottom surface, and one or more through-bores arranged proximate the top surface to secure the integrable seat leg to the seat, wherein the one or more engaging members are operatively arranged to engage one or more respective apertures in track.

20 Claims, 8 Drawing Sheets

(56) References Cited

U.S. PATENT DOCUMENTS

| | | | | |
|---|---|---|---|---|
| 4,936,527 | A * | 6/1990 | Gorges | B64C 1/20 104/165 |
| 5,083,726 | A | 1/1992 | Schurr | |
| 5,178,346 | A * | 1/1993 | Beroth | B64D 9/003 244/118.1 |
| 5,522,640 | A * | 6/1996 | Bilezikjian | B60N 2/4214 188/377 |
| 6,786,340 | B2 * | 9/2004 | Ford | A47F 5/0815 211/103 |
| 6,846,044 | B2 | 1/2005 | Moffa et al. | |
| 7,029,215 | B2 * | 4/2006 | Dowty | B64D 11/0696 410/102 |
| 7,370,832 | B2 * | 5/2008 | Frantz | B64C 1/20 244/118.6 |
| 7,695,225 | B2 * | 4/2010 | Pozzi | B60N 2/0825 410/104 |
| 7,857,259 | B2 * | 12/2010 | Baatz | B64C 1/20 244/118.6 |
| 7,975,979 | B2 | 7/2011 | Bishop | |
| 8,528,860 | B2 * | 9/2013 | VanderWolk | B64D 11/0696 244/118.5 |
| 9,284,056 | B2 * | 3/2016 | Mejuhas | B64D 11/0696 |
| 9,622,595 | B2 * | 4/2017 | Kozak | G09F 3/204 |
| 9,637,026 | B2 | 5/2017 | Cardone et al. | |
| 9,718,552 | B2 * | 8/2017 | Zheng | B64D 11/0648 |
| 9,878,639 | B2 * | 1/2018 | Sawdy | B60N 2/01525 |
| 9,919,803 | B2 * | 3/2018 | Pozzi | B64D 11/0636 |
| 2001/0047974 | A1 * | 12/2001 | Berlingieri | A47F 5/08 211/106 |
| 2003/0085322 | A1 * | 5/2003 | Weekly | B64D 11/06 244/118.5 |
| 2005/0211836 | A1 * | 9/2005 | Frantz | B64C 1/20 244/118.6 |
| 2006/0097109 | A1 * | 5/2006 | Laib | B64D 11/0696 244/118.6 |
| 2006/0263164 | A1 * | 11/2006 | Dowty | B64D 11/0696 410/105 |
| 2007/0026707 | A1 * | 2/2007 | Pozzi | B60N 2/0825 439/157 |
| 2007/0063122 | A1 * | 3/2007 | Bowd | B64C 1/20 248/429 |
| 2010/0096502 | A1 * | 4/2010 | VanderWolk | B64D 11/0696 244/122 R |
| 2010/0108808 | A1 * | 5/2010 | Allain | B64D 11/0696 244/118.6 |
| 2011/0062286 | A1 * | 3/2011 | Pinkal | B64D 11/0696 244/122 R |
| 2011/0233337 | A1 * | 9/2011 | Pozzi | B64C 1/18 244/122 R |
| 2014/0042273 | A1 * | 2/2014 | Day | B64D 11/0696 244/122 R |
| 2016/0023769 | A1 * | 1/2016 | Zheng | B64D 11/0648 297/452.18 |
| 2016/0107542 | A1 * | 4/2016 | Trimble | B60N 2/01575 296/65.03 |
| 2017/0190408 | A1 * | 7/2017 | Burd | B64D 11/04 |
| 2019/0092478 | A1 * | 3/2019 | Gilbert | B64C 1/20 |
| 2019/0106217 | A1 * | 4/2019 | Hildom | B64D 11/0696 |

* cited by examiner

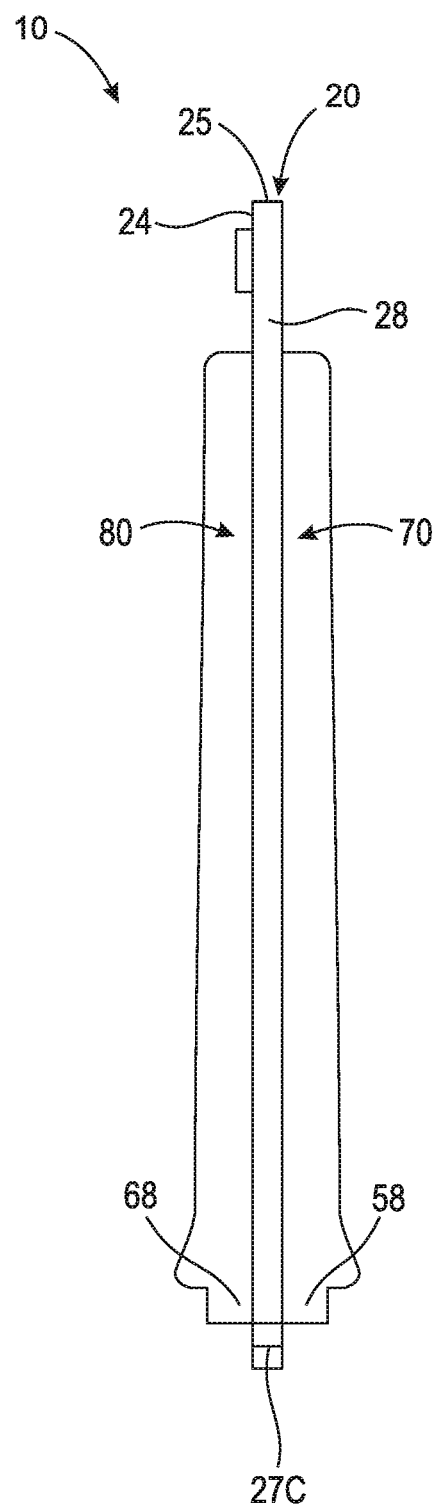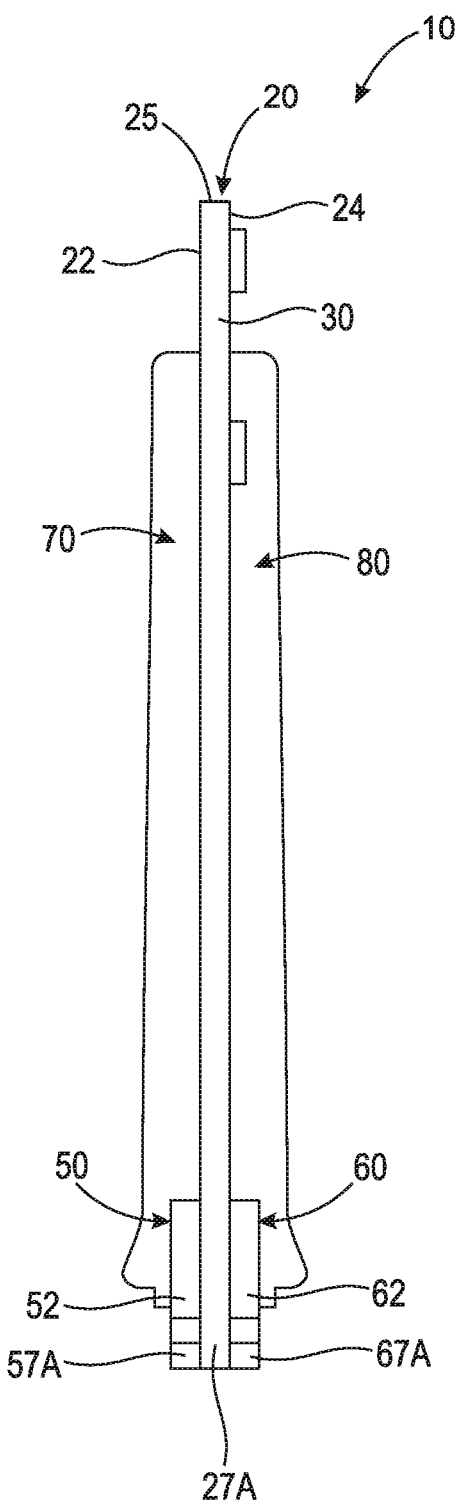
Fig. 2A
Fig. 2B

INTEGRABLE SEAT LEG

CROSS-REFERENCE TO RELATED APPLICATIONS

This application claims the benefit under 35 U.S.C. § 119(e) of U.S. Provisional Application No. 62/568,577, filed Oct. 5, 2017, which application is incorporated herein by reference in its entirety.

FIELD

The present invention relates generally to floor-mounted tracks and seat adapters for positioning and locking original equipment manufacturer components within a transportation vehicle, and in particular, an integrable seat leg that allows original equipment manufacturer seats to be secured in various positions within the vehicle.

BACKGROUND

Cars, trucks, vans, airplanes, para-transit vehicles, buses, taxicabs, mobility cars, accessible sport-utility vehicles (SUV), and the like, have been adapted to include track systems that accommodate various types of equipment, cargo, and seating arrangements. Seating arrangements include standard one, two, or three passenger seating, transit seating, and wheelchair accessible seating. Track systems include horizontal A-tracks, vertical A-tracks, horizontal E-tracks, vertical E-tracks, F-tracks, and L-tracks. These tracks can be made of a variety of materials including iron and steel and can be all different lengths and widths. The track types (A, E, F, and L) are differently shaped and/or arranged to accommodate different fittings. A-tracks are traditionally used for cargo. L-tracks are traditionally used for tie downs and accessories such as oxygen tanks. Some seat adapters operate with L-tracks. The desired track system depends on the type of seating or equipment to be secured and the restraining mechanisms to be used with the seating or equipment.

The differences between the types of tracks can be subtle or blatant. Vertical A-tracks contain elongated rectangular apertures that are evenly distributed along the longitudinal axis of the track; each aperture is parallel to the sides of the track. Horizontal A-tracks contain elongated rectangular apertures that are also evenly dispersed along the longitudinal axis of the track; each aperture is arranged transversely to the sides of the track. E-tracks also contain generally elongated rectangular apertures disposed within the track, but E-tracks differ from A-tracks in cross section. In cross section, A-track apertures are in line with the track, whereas E-track apertures contain protrusions. F-tracks contain circular apertures in the track. The apertures in F-tracks, like the apertures in A-tracks, are in-line with the track. L-tracks contain a channel along the longitudinal axis of the track, a slot formed through the upper surface of the track in communication with the channel, and cylindrical apertures superimposed above the slot in the top surface of the track. In cross section, L-tracks are generally C-shaped. U.S. Pat. No. 7,975,979 (Bishop) discloses an L-track of this type. Similarly, U.S. Pat. No. 4,771,969 (Dowd) and U.S. Pat. No. 5,083,726 (Schurr) describe L-tracks.

Such track systems can be installed in the floor or along the walls of an array of vehicles to removably attach and secure cargo, standard passenger seats, transit seats, and/or wheelchairs. These track systems enable a vehicle owner and/or operator to set and vary the seating configuration of a vehicle cabin. However, to install such track systems, the original equipment manufacturer (OEM) seats are removed and discarded in place of new seats that can be used with the new track system.

Therefore, there has been a long-felt need for an integral seat leg that can be secured to an OEM seat and used in any and all of the available track systems.

SUMMARY

According to aspects illustrated herein, there is provided an integrable seat leg for an original equipment manufacturer seat, comprising a vertical member, including a front end and a rear end, a first side surface and a second side surface, a top surface and a bottom surface, one or more engaging members extending from the bottom surface, and one or more through-bores arranged proximate the top surface to secure the integrable seat leg to the seat, wherein the one or more engaging members are operatively arranged to engage one or more respective apertures in track.

According to aspects illustrated herein, there is provided an integrable seat leg for an original equipment manufacturer seat, comprising a vertical member, including a front end and a rear end, a first side surface and a second side surface, a top surface and a bottom surface, one or more engaging members extending from the bottom surface and operatively arranged to engage one or more respective apertures in track, and one or more through-bores arranged proximate the top surface to secure the integrable seat leg to the seat, and at least one flange extending from one of the first side surface and the second side surface, and at least one protrusion extending from one of the first side surface and the second side surface.

According to aspects illustrated herein, there is provided a method for creating an integrable original equipment manufacturer seat, comprising removing an original equipment manufacturer seat from a vehicle, installing a track system on a floor of the vehicle, the track system including one or more frames having one or more apertures, securing an integrable seat leg to the original equipment manufacturer seat, the integrable seat leg including a front end and a rear end, a first side surface and a second side surface, a top surface and a bottom surface, one or more engaging members extending from the bottom surface and operatively arranged to engage the one or more apertures, and one or more through-bores arranged proximate the top surface to secure the integrable seat leg to the seat, and securing the integrable seat leg to the track system by engaging the one or more engaging members with the one or more apertures.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 2A is front elevational view of the integrable seat leg shown in FIG. 1;

FIG. 2B is a rear elevational view of the integrable seat leg shown in FIG. 1;

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, and/or pneumatics.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Figure 1:
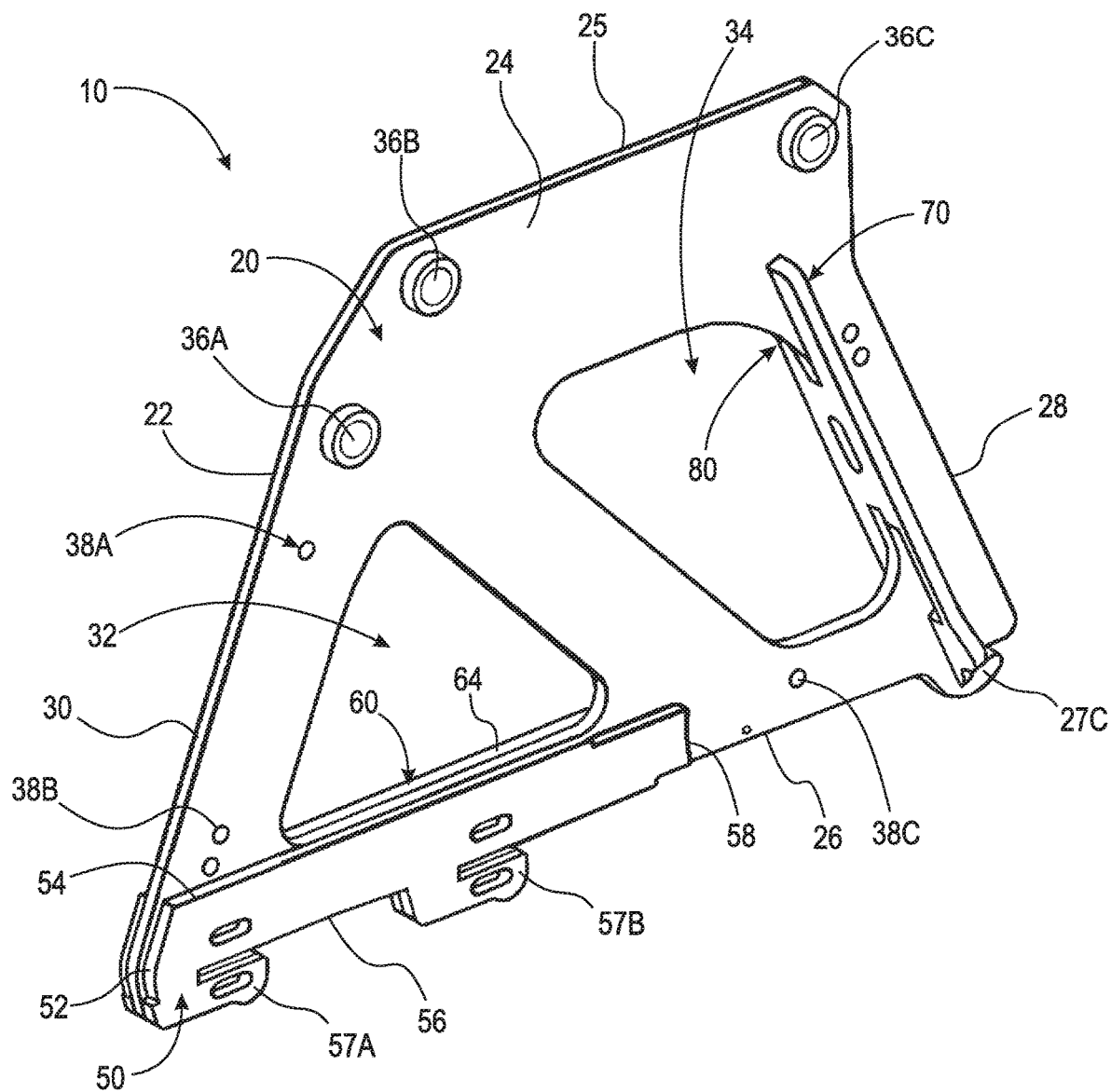
FIG. 1 is a rear perspective view of an integrable seat leg.

Adverting now to the figures, FIG. 1 is a rear perspective view of integrable seat leg 10. FIG. 2A is front elevational view of integrable seat leg 10. FIG. 2B is a rear elevational view of integrable seat leg 10. The following description should be read in light of FIGS. 1, 2A, and 2B. Integrable seat leg 10 generally comprises vertical member 20. In an example embodiment, integrable seat leg 10 further comprises protrusion 50, protrusion 60, flange 70, and flange 80.

Vertical member 20 is generally a plate comprising surface 22, surface 24, top surface 25, bottom surface 26, front end 28, and rear end 30. Vertical member 20 is generally rectangular, however, may be any suitable shape (e.g., square-, triangular-, circular-, ovular-, or rhomboidal-shaped). Vertical member 20 may comprise one or more apertures, such as aperture 32 and aperture 34. Aperture 32 is generally triangular and extends from surface 22 to surface 24. Aperture 34 is generally ovular and extends from surface 22 to surface 24. It should be appreciated that apertures 32 and 34 may be any shape suitable for reducing the weight of vertical member 20 without jeopardizing the strength thereof. Bottom surface 26 comprises a plurality of engaging members. In the embodiment shown, bottom surface 26 comprises engaging member 27A (see FIG. 2B), engaging member 27B (not shown), and engaging member 27C. Engaging member 27A is arranged proximate rear end 30, engaging member 27C is arranged proximate front end 28, and engaging member 27B (not shown) is arranged between engaging members 27A and 27C. Engaging members 27A-C are operatively arranged to engage apertures 106 in frames 102 and secure integrable seat leg 10 to track 100. Vertical member 20 further comprises through-bores 36A-C, which are operatively arranged thereon to secure integrable seat leg 10 to an original equipment manufacturer (OEM) vehicle seat or bench. In the embodiment shown, vertical member 20 includes three through-bores, however, any number of through-bores suitable for securing integrable seat leg to an OEM vehicle seat may be used. Vertical member 20 may further comprise holes 38A-C. Holes 38A-C are operatively arranged to secure spacer bars between multiple integrable seat legs. For example, for a single or a double OEM vehicle seat, two integrable seat legs may be needed. One or more spacer bars are secured at each end within the holes. These spacer bars ensure the engaging members of the integrable seat legs are properly spaced to engage the apertures of the track rails (see FIG. 4). In another example, for a double wide or triple wide OEM vehicle seat, three integrable seat legs may be needed. Thus, spacer bars might be included between each of the three integrable seat legs.

Protrusion 50 extends from surface 22. Protrusion 50 may be an integral part of vertical member 20 (i.e., formed together as a single component), or may be secured to vertical member 20 using any suitable means (e.g., welding, bolting, adhesives, etc.). Protrusion 50 comprises rear end 52, top surface 54, bottom surface 56, and front end 58. In the embodiment shown, rear end 52 is aligned with rear end 30 and bottom surface 56 is aligned with bottom surface 26. Bottom surface 56 includes engaging members 57A and 57B. In the embodiment shown, engaging members 57A and 57B are aligned with engaging members 27A and 27B, respectively. Engaging members 57A-B are operatively arranged to engage apertures 106 in frames 102 and secure integrable seat leg 10 to track 100 (see FIG. 4).

Protrusion 60 extends from surface 24. Protrusion 60 may be an integral part of vertical member 20 (i.e., formed together as a single component), or may be secured to vertical member 20 using any suitable means (e.g., welding, bolting, adhesives, etc.). Protrusion 60 comprises rear end 62, top surface 64, bottom surface 66 (not shown), and front end 68. In the embodiment shown, rear end 62 is aligned with rear end 30 and bottom surface 66 is aligned with bottom surface 26. Bottom surface 66 includes engaging members 67A and 67B (not shown). In the embodiment shown, engaging members 67A and 67B are aligned with engaging members 27A and 27B, respectively. Engaging members 67A-B are operatively arranged to engage apertures 106 in frames 102 and secure integrable seat leg 10 to track 100 (see FIG. 4).

Flange 70 extends from surface 22 proximate front end 28. Flange 70 may be an integral part of vertical member 20 (i.e., formed together as a single component), or may be secured to vertical member 20 using any suitable means (e.g., welding, bolting, adhesives, etc.). As shown, flange 70 is generally a rectangular prism, however, could be any shape suitable to add strength to integrable seat leg 10.

Flange 80 extends from surface 24 proximate front end 28. Flange 80 may be an integral part of vertical member 20 (i.e., formed together as a single component), or may be secured to vertical member 20 using any suitable means (e.g., welding, bolting, adhesives, etc.). As shown, flange 80 is generally a rectangular prism, however, could be any shape suitable to add strength to integrable seat leg 10.

In an example embodiment, a single plate is inserted into an aperture in vertical member 20 proximate end 28 to form flanges 70 and 80. The plate is then welded in the aperture.

Figure 3:
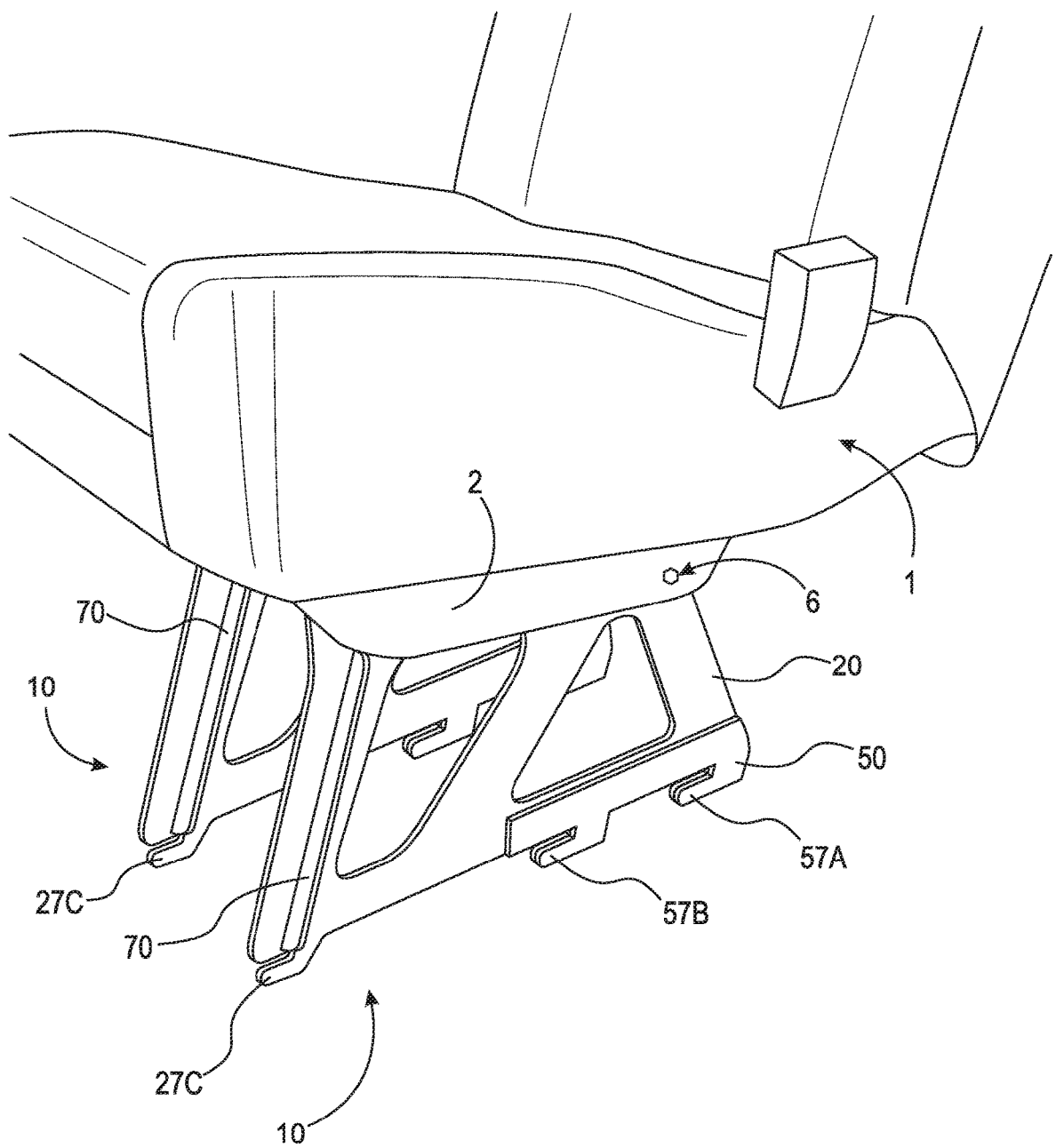
FIG. 3 is a perspective view of the integrable seat leg shown in FIG. 1 secured to a seat.

FIG. 3 is a perspective view of integrable seat leg 10 secured to OEM seat 1 (specifically two integrable seat legs). As shown, OEM seat 1 includes bracket 2 extending downward therefrom. OEM seat 1 may include a plurality of brackets. Integrable seat leg is positioned on a first side of bracket 2. Vertical member 20 may abut against bracket 2 or one or more spacers or shims may be arranged there between to provide the correct spacing with respect to track 100 (see FIG. 4). One or more bolts 6 are used to secure integrable seat leg 10 to bracket 2. Bolts 6 are inserted through bracket 2 and respective holes 36A, 36B, and/or 36C and secured with a nut. Any suitable fastening means may be used to secure integrable seat leg 10 to OEM seat 1 (e.g., welding, adhesives, rivets, etc.).

Figure 4:
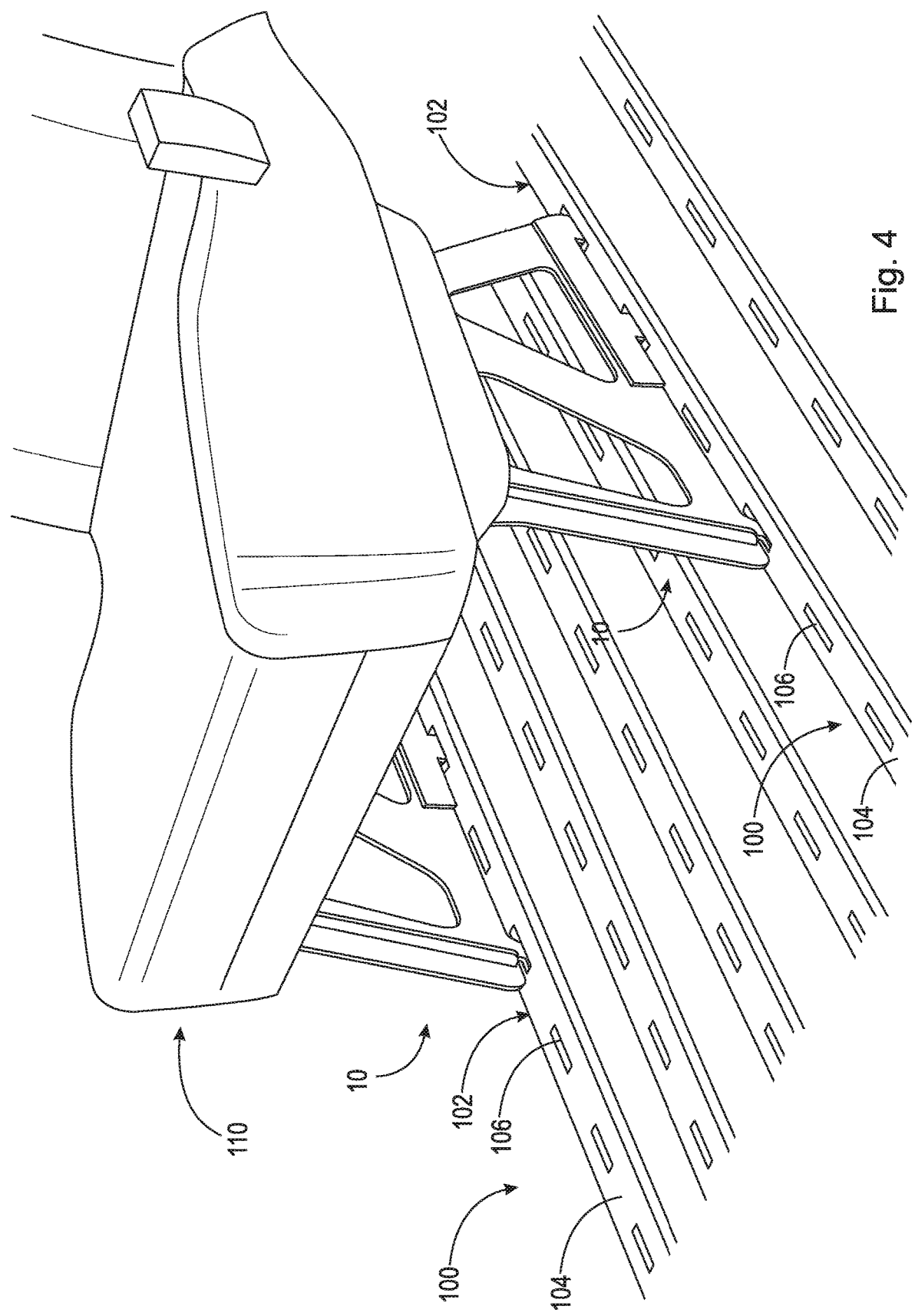
FIG. 4 is a perspective view of the integrable seat leg shown in FIG. 1, secured to a seat and installed in a floor track.

FIG. 4 is a perspective view of integrable seat leg 10 secured to OEM bench seat 110 and installed in floor track 100. Floor track 100 generally comprises a plurality of frames 102. Each of said plurality of frames 102 comprises top surface 104 and a plurality of apertures 106. Integrable seat leg 10 is arranged with front end 28 directed toward the front end of the vehicle. Engaging members 27A-C, and 57A-B/67A-B if included on integrable seat leg 10, are inserted into respective apertures 106. Integrable seat leg 10 is then displaced in the direction of the front end of the vehicle, thereby locking engaging members 27A-C about top surface 104. The crux of this invention is to enable OEM seats and benches to be used A-tracks, vertical A-tracks, horizontal E-tracks, vertical E-tracks, F-tracks, L-tracks, or X-tracks. Using integrable seat leg 10, OEM seats can be repositioned at various positions within the vehicle.

Figure 5:
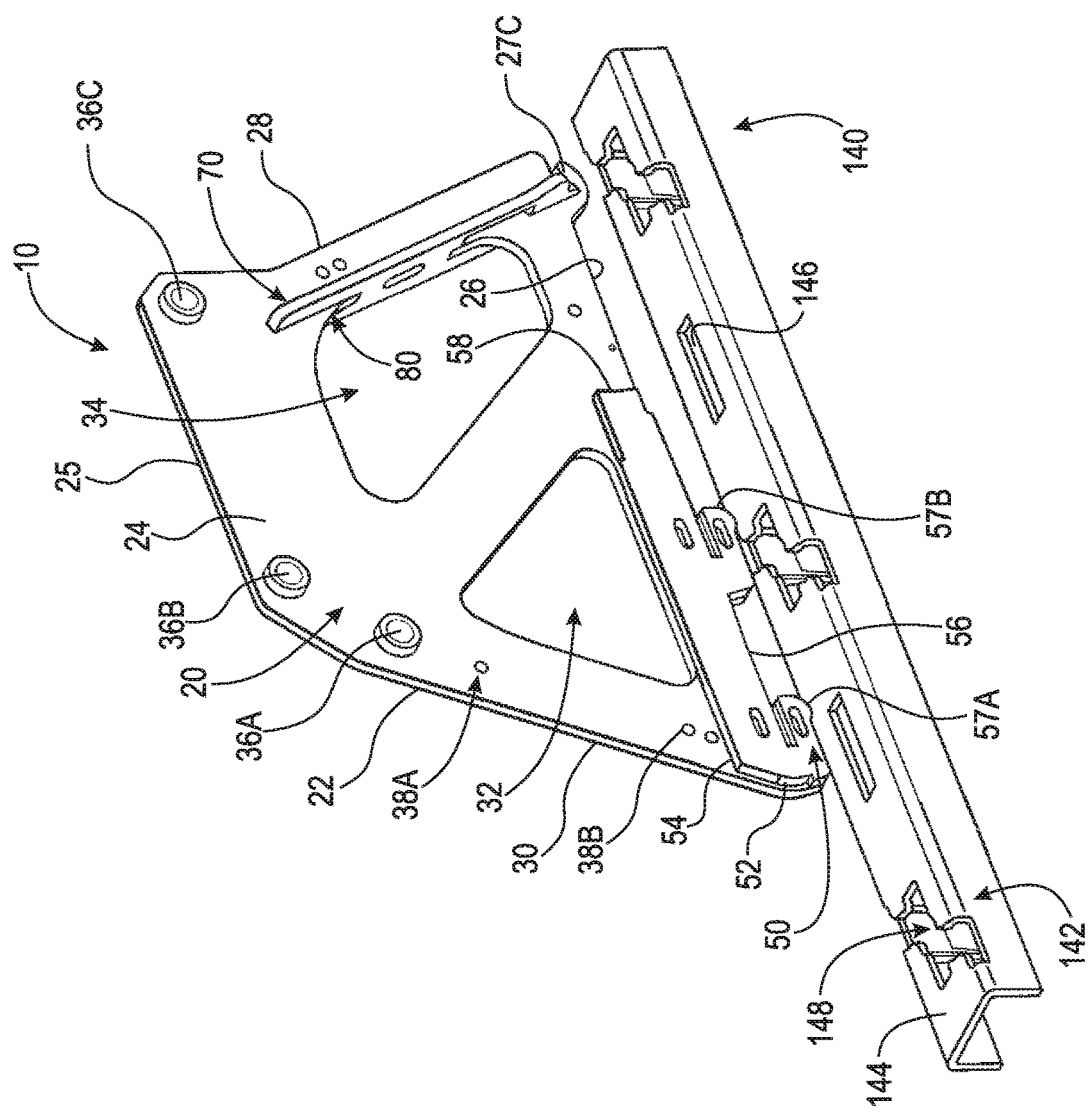
FIG. 5 is a perspective exploded assembly view of an the integrable seat leg shown in FIG. 1 ready for insertion into an X-track type floor track.

FIG. 5 is a perspective exploded assembly view of integrable seat leg 10 ready for insertion into X-track type floor track 140. X-track type floor track 140 generally comprises a plurality of frames 142. Each of said plurality of frames 142 comprises top surface 104, a plurality of apertures 146, and a plurality of X-shaped apertures 148. Using engaging members 57A-C, integrable seat leg 10 can be easily mounted to the vehicle floor at various locations thereon. Once engaged in X-track type floor track 140, integrable seat leg 10 is locked in place using a latch or other suitable locking device.

Figure 6:
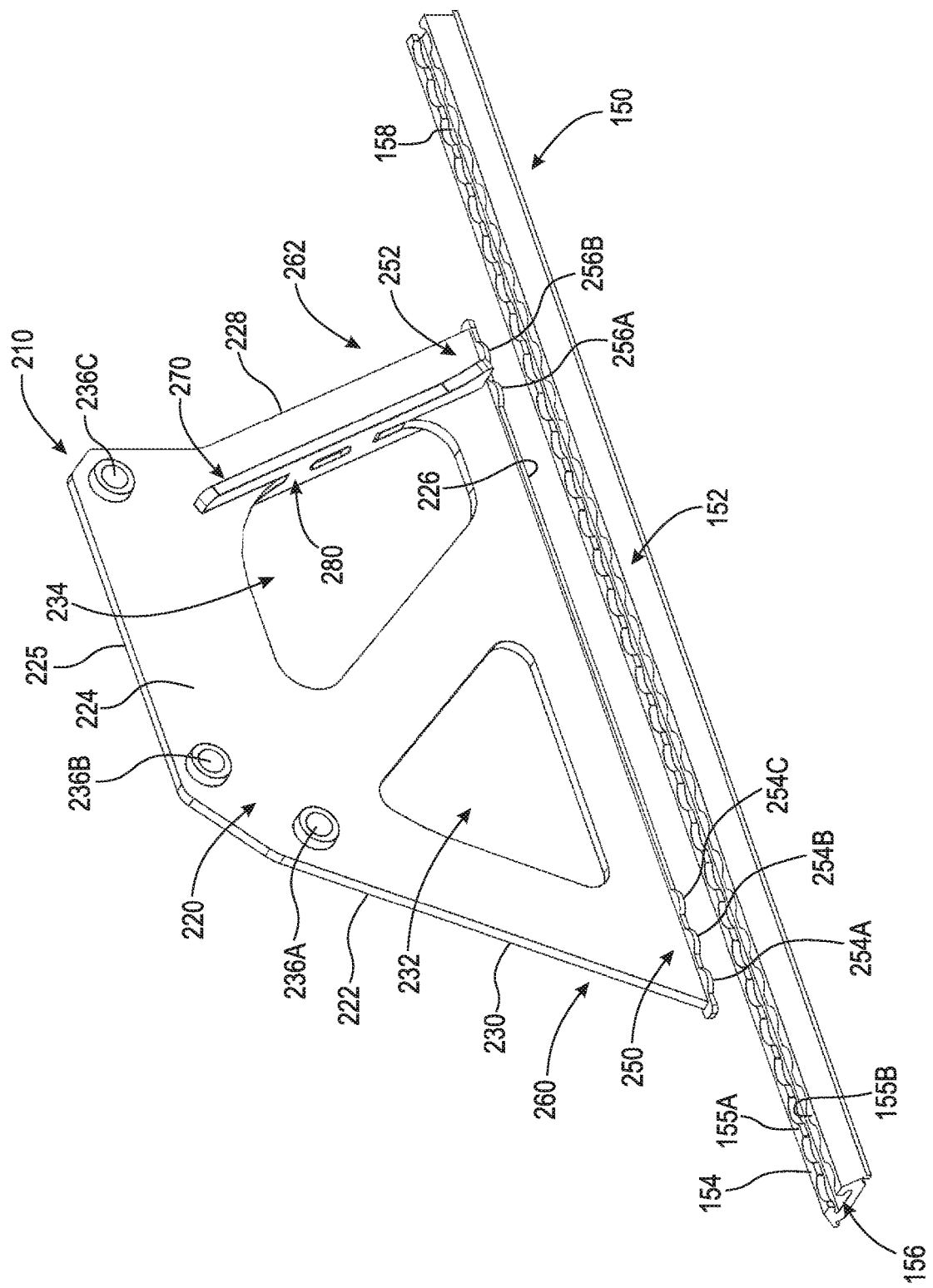
FIG. 6 is a perspective exploded assembly view of an integrable seat leg ready for insertion into an L-track type floor track.

FIG. 6 is a perspective exploded assembly view of integrable seat leg 210 ready for insertion into L-track type floor track 150. Integrable seat leg 210 generally comprises vertical member 220. In an example embodiment, integrable seat leg 210 further comprises engaging members 250, 252, 260, and 262, flange 270, and flange 280.

Vertical member 220 is generally a plate comprising surface 222, surface 224, top surface 225, bottom surface 226, front end 228, and rear end 230. Vertical member 220 is generally rectangular, however, may be any suitable shape (e.g., square-, triangular-, circular-, ovular-, or rhomboidal-shaped). Vertical member 220 may comprise one or more apertures, such as aperture 232 and aperture 234. Aperture 232 is generally triangular and extends from surface 222 to surface 224. Aperture 234 is generally ovular and extends from surface 222 to surface 224. It should be appreciated that apertures 232 and 234 may be any shape suitable for reducing the weight of vertical member 220 without jeopardizing the strength thereof. Bottom surface 226 comprises a plurality of protrusions. In the embodiment shown, bottom surface 226 comprises engaging member 250, engaging member 252, engaging member 260, and engaging member 262. Engaging members 250 and 260 are arranged proximate rear end 230, and engaging members 252 and 260 are arranged proximate front end 228. It should be appreciated that vertical member 220 may comprise any number of engaging members, for example, one or more engaging members, suitable for securing integrable seat leg 210 to L-track type floor track.

Engaging member 250 comprises a plurality of protrusions 254A-C extending from surface 224. Protrusions 254A-C are generally hemispherical discs that extend perpendicularly from surface 224 to engage apertures 158 and channel 156 in L-track type floor track 150. It should be appreciated that engaging member 250 may comprise any number of protrusions (e.g., one or more protrusions) suitable to secure integrable seat leg 210 to L-track type floor track 150. Additionally, it should be appreciated that protrusions 254A-C may comprise any geometric shape suitable for securing integrable seat leg 210 to L-track type floor track 150, for example, triangular, ovular, rectangular, square, etc. Protrusions 254A-C are aligned with apertures 158 of frame 152. Protrusions 254A-C are inserted through apertures 158 from top surface 154 such that they are arranged in channel 156. Integrable seat leg 210 is then displaced axially along frame 152 such that flanges 155A-B retain protrusions 254A-C within channel 156, thus locking integrable seat leg 210 to L-track type floor track 150.

Engaging member 260 is substantially similar to, and aligned with, engaging member 250. Engaging member 260 comprises a plurality of protrusions 264A-C (not shown) extending from surface 222. Protrusions 264A-C (not shown) are generally hemispherical discs that extend perpendicularly from surface 222 to engage apertures 158 and channel 156 in L-track type floor track 150. It should be appreciated that engaging member 260 may comprise any number of protrusions (e.g., one or more protrusions) suitable to secure integrable seat leg 210 to L-track type floor track 150. Additionally, it should be appreciated that protrusions 264A-C (not shown) may comprise any geometric shape suitable for securing integrable seat leg 210 to L-track type floor track 150, for example, triangular, ovular, rectangular, square, etc. Protrusions 264A-C (not shown) are aligned with apertures 158 of frame 152. Protrusions 264A-C (not shown) are inserted through apertures 158 from top surface 154 such that they are arranged in channel 156. Integrable seat leg 210 is then displaced axially along frame 152 such that flanges 155A-B retain protrusions 264A-C (not shown) within channel 156, thus locking integrable seat leg 210 to L-track type floor track 150.

Engaging member 252 comprises a plurality of protrusions 256A-B extending from surface 224. Protrusions 256A-B are generally hemispherical discs that extend perpendicularly from surface 224 to engage apertures 158 and channel 156 in L-track type floor track 150. It should be appreciated that engaging member 252 may comprise any number of protrusions (e.g., one or more protrusions) suitable to secure integrable seat leg 210 to L-track type floor track 150. Additionally, it should be appreciated that protrusions 256A-B may comprise any geometric shape suitable for securing integrable seat leg 210 to L-track type floor track 150, for example, triangular, ovular, rectangular, square, etc. Protrusions 256A-B are aligned with apertures 158 of frame 152. Protrusions 256A-B are inserted through apertures 158 from top surface 154 such that they are arranged in channel 156. Integrable seat leg 210 is then displaced axially along frame 152 such that flanges 155A-B retain protrusions 256A-B within channel 156, thus locking integrable seat leg 210 to L-track type floor track 150.

Engaging member 262 is substantially similar to, and aligned with, engaging member 252. Engaging member 262 comprises a plurality of protrusions 266A-B (not shown) extending from surface 222. Protrusions 266A-B (not shown) are generally hemispherical discs that extend perpendicularly from surface 222 to engage apertures 158 and channel 156 in L-track type floor track 150. It should be appreciated that engaging member 262 may comprise any number of protrusions (e.g., one or more protrusions) suitable to secure integrable seat leg 210 to L-track type floor track 150. Additionally, it should be appreciated that protrusions 266A-B (not shown) may comprise any geometric shape suitable for securing integrable seat leg 210 to L-track type floor track 150, for example, triangular, ovular, rectangular, square, etc. Protrusions 266A-B (not shown) are aligned with apertures 158 of frame 152. Protrusions 266A-C (not shown) are inserted through apertures 158 from top surface 154 such that they are arranged in channel 156. Integrable seat leg 210 is then displaced axially along frame 152 such that flanges 155A-B retain protrusions 266A-B (not shown) within channel 156, thus locking integrable seat leg 210 to L-track type floor track 150.

Using engaging members 250, 252, 260, and 262, integrable seat leg 210 can be easily mounted to the vehicle floor at various locations thereon. Once engaged in L-track type floor track 150, integrable seat leg 210 is locked in place using a latch or other suitable locking device.

Vertical member 220 further comprises through-bores 236A-C, which are operatively arranged thereon to secure integrable seat leg 210 to an original equipment manufacturer (OEM) vehicle seat or bench. In the embodiment shown, vertical member 220 includes three through-bores, however, any number of through-bores suitable for securing integrable seat leg to an OEM vehicle seat may be used. Vertical member 220 may further comprise holes operatively arranged to secure spacer bars between multiple integrable seat legs. For example, for a single or a double OEM vehicle seat, two integrable seat legs may be needed. One or more spacer bars are secured at each end within the holes. These spacer bars ensure the engaging members of the integrable seat legs are properly spaced to engage the apertures of the track rails (see FIG. 4). In another example, for a double wide or triple wide OEM vehicle seat, three integrable seat legs may be needed. Thus, spacer bars might be included between each of the three integrable seat legs.

Flange 270 extends from surface 222 proximate front end 228. Flange 270 may be an integral part of vertical member 220 (i.e., formed together as a single component), or may be secured to vertical member 220 using any suitable means (e.g., welding, bolting, adhesives, etc.). As shown, flange 270 is generally a rectangular prism, however, could be any shape suitable to add strength to integrable seat leg 210.

Flange 280 extends from surface 224 proximate front end 228. Flange 280 may be an integral part of vertical member 220 (i.e., formed together as a single component), or may be secured to vertical member 220 using any suitable means (e.g., welding, bolting, adhesives, etc.). As shown, flange 280 is generally a rectangular prism, however, could be any shape suitable to add strength to integrable seat leg 210.

In an example embodiment, a single plate is inserted into an aperture in vertical member 220 proximate end 228 to form flanges 270 and 280. The plate is then welded in the aperture.

Figure 7:
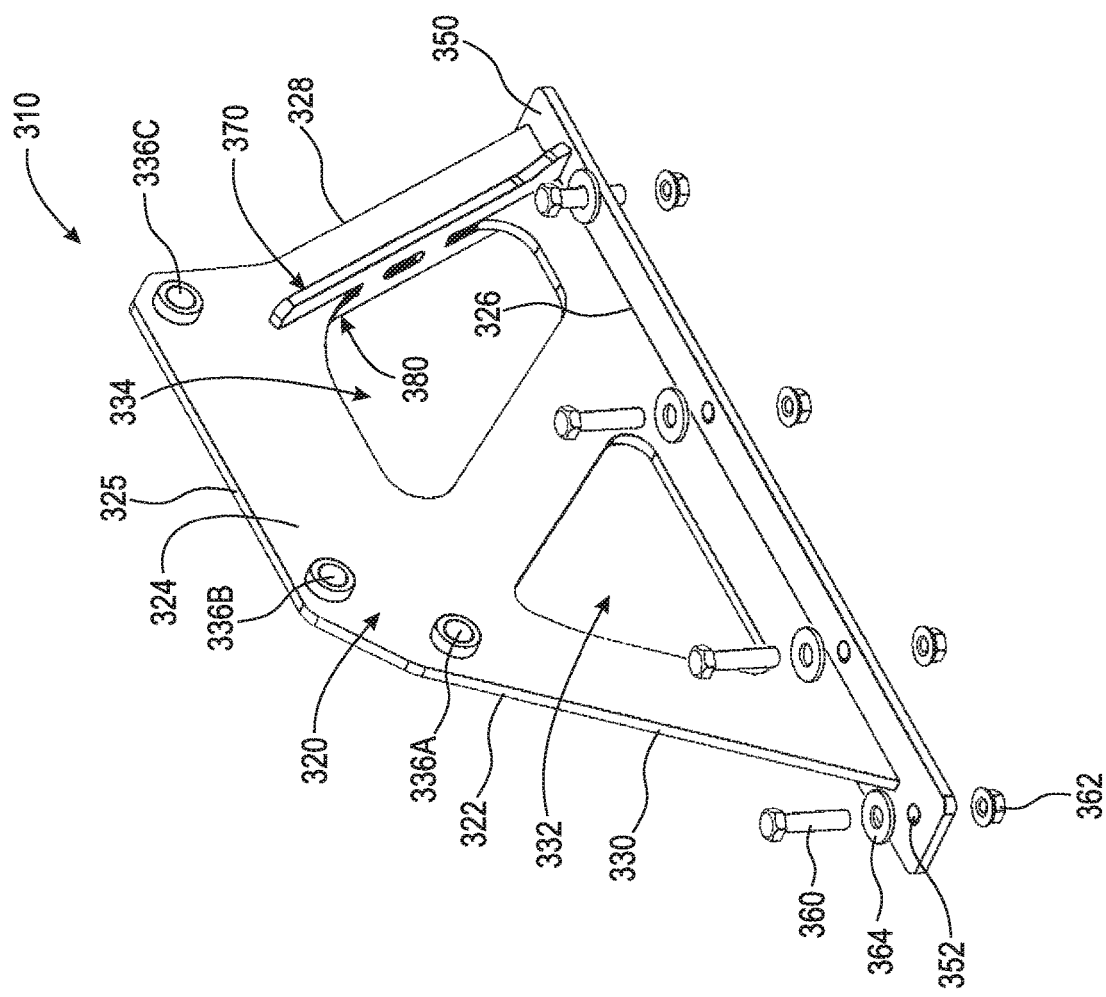
FIG. 7 is a perspective exploded assembly view of an integrable seat leg ready for mounting to a vehicle floor; and, FIG. 8 is a perspective assembly view of an integrable seat leg installed in a floor track and locked into place using a latch.

FIG. 7 is a perspective exploded assembly view of integrable seat leg 310 ready for mounting to a vehicle floor using a plurality of fasteners (e.g., bolts, rivets, screws, nails, etc.). Integrable seat leg 310 generally comprises vertical member 320. In an example embodiment, integrable seat leg 310 further comprises flange 350, flange 370, and flange 380.

Vertical member 320 is generally a plate comprising surface 322, surface 324, top surface 325, bottom surface 326, front end 328, and rear end 330. Vertical member 320 is generally rectangular, however, may be any suitable shape (e.g., square-, triangular-, circular-, ovular-, or rhomboidal-shaped). Vertical member 320 may comprise one or more apertures, such as aperture 332 and aperture 334. Aperture 332 is generally triangular and extends from surface 322 to surface 324. Aperture 334 is generally ovular and extends from surface 322 to surface 324. It should be appreciated that apertures 332 and 334 may be any shape suitable for reducing the weight of vertical member 320 without jeopardizing the strength thereof. Bottom surface 326 comprises a plurality of protrusions. In the embodiment shown, bottom surface 326 is connected to flange 350. Flange 350 comprises a plurality of through-bores 352. The plurality of fasteners are arranged to be inserted through the plurality of through-bores and a plurality of corresponding holes in the vehicle floor and be fastened thereto. In an example embodiment bolts 360, nuts 362, and washers 364 are used to secure flange 350 to the vehicle floor thus securing integrable seat leg 310. Flange 350 is generally rectangular; however it should be appreciated that flange 350 may be any shape suitable for securing integrable seat leg 310 to the vehicle floor, such as triangular, square, ovular, etc. Additionally, it should be appreciated that flange 350 does not have to be one continuous flange, but rather may be a plurality of smaller flanges having one or more through-bores.

Vertical member 320 further comprises through-bores 336A-C, which are operatively arranged thereon to secure integrable seat leg 310 to an original equipment manufacturer (OEM) vehicle seat or bench. In the embodiment shown, vertical member 320 includes three through-bores, however, any number of through-bores suitable for securing integrable seat leg to an OEM vehicle seat may be used. Vertical member 320 may further comprise holes operatively arranged to secure spacer bars between multiple integrable seat legs. For example, for a single or a double OEM vehicle seat, two integrable seat legs may be needed.

One or more spacer bars are secured at each end within the holes. These spacer bars ensure the engaging members of the integrable seat legs are properly spaced to engage the apertures of the track rails (see FIG. 4). In another example, for a double wide or triple wide OEM vehicle seat, three integrable seat legs may be needed. Thus, spacer bars might be included between each of the three integrable seat legs.

Flange 370 extends from surface 322 proximate front end 328. Flange 370 may be an integral part of vertical member 320 (i.e., formed together as a single component), or may be secured to vertical member 320 using any suitable means (e.g., welding, bolting, adhesives, etc.). As shown, flange 370 is generally a rectangular prism, however, could be any shape suitable to add strength to integrable seat leg 310.

Flange 380 extends from surface 324 proximate front end 328. Flange 380 may be an integral part of vertical member 320 (i.e., formed together as a single component), or may be secured to vertical member 320 using any suitable means (e.g., welding, bolting, adhesives, etc.). As shown, flange 380 is generally a rectangular prism, however, could be any shape suitable to add strength to integrable seat leg 310.

In an example embodiment, a single plate is inserted into an aperture in vertical member 320 proximate end 328 to form flanges 370 and 380. The plate is then welded in the aperture.

Figure 8:
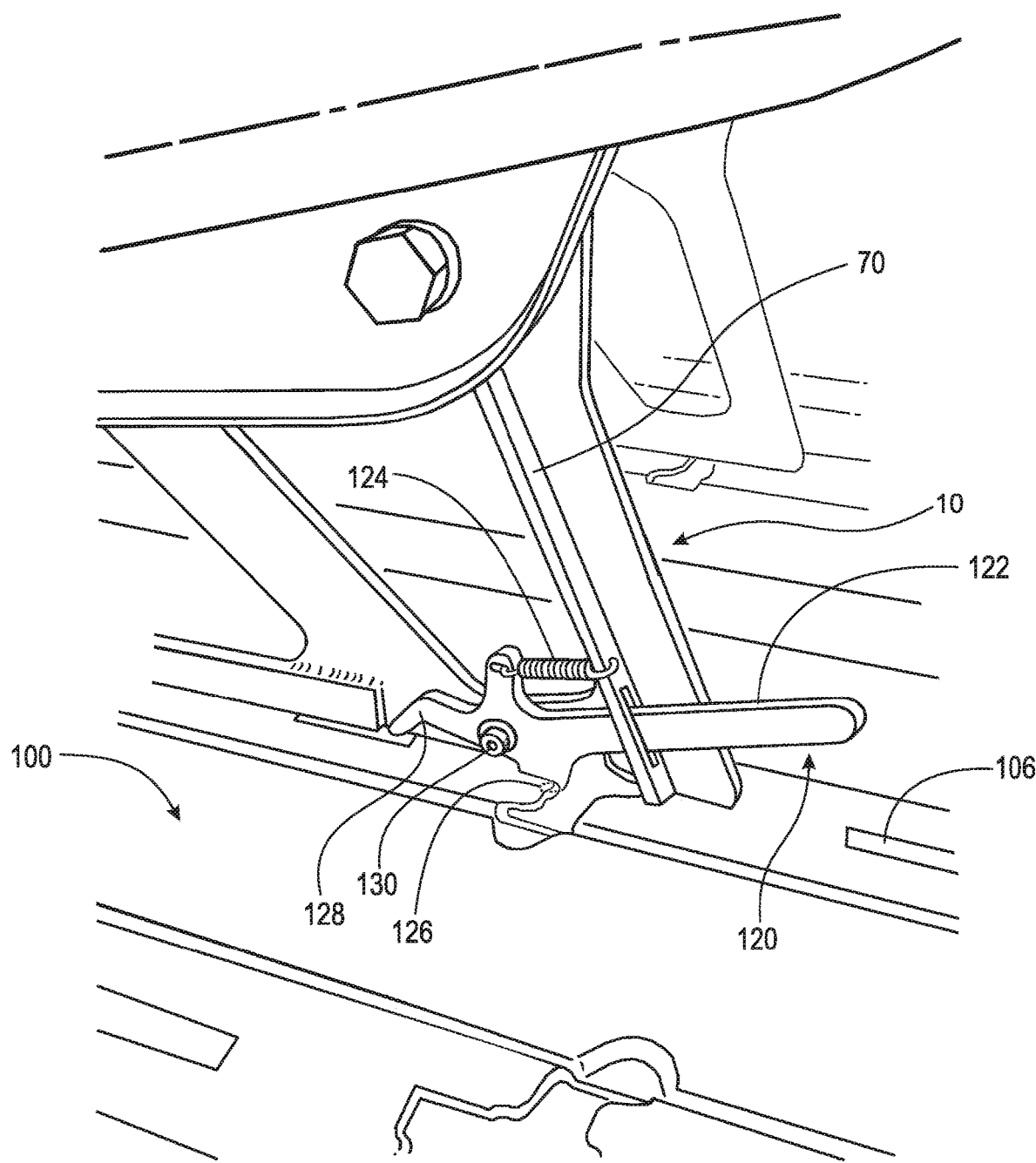

FIG. 8 is a perspective assembly view of integrable seat leg 10 installed in floor track 100 and locked into place using latch 120. Latch 120 comprises bar 122, spring 124, hook 126, and hook 128. Latch 120 is secured to integrable seat leg 10 via bolt 130. Bolt 130 may be any suitable fastener. Spring 124 connects latch 120 to flange 70. Bar 122 may extend through an aperture in flange 70. Hook 126 is arranged to engage apertures 106 and lock integrable seat leg 10 within floor track 100 (i.e., prevents integrable seat leg 10 from displacing toward the back of the vehicle, and maintains engaging members engagement with apertures 106).

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

1 Original equipment manufacturer (OEM) seat
2 Bracket
6 Bolts
10 Integrable seat leg
20 Vertical member
22 Surface
24 Surface
25 Top surface
26 Bottom surface
27A Engaging member
27B Engaging member
27C Engaging member
28 Front end
30 Rear end
32 Aperture
34 Aperture
36A Through-bore
36B Through-bore
36C Through-bore
38A Hole
38B Hole
38C Hole
50 Protrusion
52 Rear end
54 Top surface
56 Bottom surface
57A Engaging member
57B Engaging member
58 Front end
60 Protrusion
62 Rear end
64 Top surface
66 Bottom surface
67A Engaging member
67B Engaging member
68 Front end
70 Flange
80 Flange
100 Floor track
102 Frames
104 Top surface
106 Apertures
110 Original equipment manufacturer (OEM) bench seat
120 Latch
122 Bar
124 Spring
126 Hook
128 Hook
130 Bolt
140 X-track type floor track
142 Frames
144 Top surface
146 Apertures
148 X-shaped apertures
150 L-track type floor track
152 Frame
154 Top surface
155A Flange
155B Flange
156 Channel
210 Integrable seat leg
220 Vertical member
222 Surface
224 Surface
225 Top surface
226 Bottom surface
228 Front end
230 Rear end
232 Aperture
234 Aperture
236A Through-bore
236B Through-bore
236C Through-bore
250 Engaging member
252 Engaging member
254A Protrusion
254B Protrusion
254C Protrusion
256A Protrusion
256B Protrusion
260 Engaging member
262 Engaging member
264A Protrusion (not shown)
264B Protrusion (not shown)
264C Protrusion (not shown)
266A Protrusion (not shown)
266B Protrusion (not shown)
270 Flange
280 Flange
310 Integrable seat leg
320 Vertical member
322 Surface
324 Surface
325 Top surface
326 Bottom surface
328 Front end
330 Rear end
332 Aperture
334 Aperture
336A Through-bore
336B Through-bore
336C Through-bore
350 Flange 352 Through-bores
360 Bolts
362 Nuts
364 Washers
370 Flange
380 Flange

What is claimed is:

1. An integrable seat leg for an original equipment manufacturer seat, comprising:
    a vertical member operatively arranged to be secured to the seat, the vertical member including:
        a front end and a rear end;
        a first side surface and a second side surface;
        a top surface and a bottom surface;
        one or more engaging members extending from the bottom surface; and,
        at least one protrusion extending from one of the first side surface and the second side surface;
    wherein the one or more engaging members are operatively arranged to engage one or more respective apertures in track.

2. The integrable seat leg as recited in claim 1, further comprising at least one flange extending from one of the first side surface and the second side surface.

3. The integrable seat leg as recited in claim 2, wherein the at least one flange is arranged proximate the front end.

4. The integrable seat leg as recited in claim 1, further comprising a first flange extending from the first side surface and a second flange extending from the second side surface, wherein the first flange and the second flange are arranged proximate the front end.

5. The integrable seat leg as recited in claim 1, further comprising one or more through-bores arranged proximate the top surface to secure the integrable seat leg to the seat.

6. The integrable seat leg as recited in claim 1, wherein the at least one protrusion is arranged proximate the rear end.

7. The integrable seat leg as recited in claim 1, further comprising a first protrusion extending from the first side surface and a second protrusion extending from the second side surface, wherein the first protrusion and the second protrusion are arranged proximate the rear end.

8. The integrable seat leg as recited in claim 1, wherein the vertical member further comprises one or more apertures.

9. The integrable seat leg as recited in claim 1, wherein the one or more engaging members comprise one or more hemispherical discs.

10. The integrable seat leg as recited in claim 9, wherein the one or more hemispherical discs are arranged perpendicular to the first side surface.

11. The integrable seat leg as recited in claim 1, further comprising a locking latch.

12. An integrable seat leg for an original equipment manufacturer seat, comprising:
    a vertical member, including:
        a front end and a rear end;
        a first side surface and a second side surface;
        a top surface and a bottom surface;
        one or more engaging members extending from the bottom surface and operatively arranged to engage one or more respective apertures in track; and,
        one or more through-bores arranged proximate the top surface to secure the integrable seat leg to the seat; and,
        at least one flange extending from one of the first side surface and the second side surface; and,
        at least one protrusion extending from one of the first side surface and the second side surface.

13. The integrable seat leg as recited in claim 12, further comprising a first flange extending from the first side surface and a second flange extending from the second side surface, wherein the first flange and the second flange are arranged proximate the front end.

14. The integrable seat leg as recited in claim 12, further comprising a first protrusion extending from the first side surface and a second protrusion extending from the second side surface, wherein the first protrusion and the second protrusion are arranged proximate the rear end.

15. The integrable seat leg as recited in claim 12, wherein the vertical member further comprises one or more apertures.

16. The integrable seat leg as recited in claim 12, wherein the one or more engaging members are hook-shaped.

17. The integrable seat leg as recited in claim 12, wherein the vertical member further comprises one or more holes arranged for one or more spacer rods.

18. A method for creating an integrable original equipment manufacturer seat, comprising:
    removing an original equipment manufacturer seat from a vehicle;
    installing a track system on a floor of the vehicle, the track system including one or more frames having one or more apertures;
    securing an integrable seat leg to the original equipment manufacturer seat, the integrable seat leg including:
        a front end and a rear end;
        a first side surface and a second side surface;
        a top surface and a bottom surface;
        one or more engaging members extending from the bottom surface and operatively arranged to engage the one or more apertures; and,
        one or more through-bores arranged proximate the top surface to secure the integrable seat leg to the seat; and,
    securing the integrable seat leg to the track system by engaging the one or more engaging members with the one or more apertures.

19. The method as recited in claim 18, wherein the step of securing the integrable seat leg to the track system comprises:
    inserting the one or more engaging members into the one or more apertures; and,
    displacing the integrable seat leg in a first direction.

20. The method as recited in claim 18, wherein the step of securing the integrable seat leg to the original equipment manufacturer seat comprises:
    aligning the one or more through-bores with respective holes in a bracket of the seat; and,
    fastening the integrable seat leg to the bracket via one or more bolts.

* * * * *